(12) United States Patent
Tiesler

(10) Patent No.: US 7,390,045 B2
(45) Date of Patent: Jun. 24, 2008

(54) SYSTEM FOR ATTACHING AN ARTICLE HOLDING ASSEMBLY TO A MOUNTING MEMBER IN A VEHICLE

(75) Inventor: John M. Tiesler, Harrison Township, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 68 days.

(21) Appl. No.: 11/424,390

(22) Filed: Jun. 15, 2006

(65) Prior Publication Data

US 2007/0290518 A1    Dec. 20, 2007

(51) Int. Cl.
B60R 7/04 (2006.01)
(52) U.S. Cl. .................... 296/24.34; 296/37.8
(58) Field of Classification Search ............. 296/24.34, 296/37.8
See application file for complete search history.

(56) References Cited

U.S. PATENT DOCUMENTS

| | | | |
|---|---|---|---|
| 4,159,137 A | 6/1979 | Richter | |
| 4,257,632 A | 3/1981 | DeStepheno | |
| 4,270,668 A | 6/1981 | Berfield | |
| 4,501,378 A | 2/1985 | Berfield | |
| 5,050,922 A | 9/1991 | Falcoff | |
| 5,100,015 A | 3/1992 | Vanderstuyf | |
| 5,322,178 A | 6/1994 | Foos | |
| 5,520,313 A | 5/1996 | Toshihide | |
| 5,522,638 A | 6/1996 | Falcoff et al. | |
| 5,755,350 A | 5/1998 | Marthaler | |
| 5,868,448 A | 2/1999 | Izumo | |
| 5,893,478 A | 4/1999 | Maruoka | |
| 6,062,623 A | 5/2000 | Lemmen | |
| 6,116,675 A | 9/2000 | Iwasawa | |
| 6,125,030 A | 9/2000 | Mola et al. | |
| 6,142,333 A | 11/2000 | Sasamoto et al. | |
| 6,176,385 B1 | 1/2001 | Feese et al. | |
| 6,176,534 B1 | 1/2001 | Duncan | |
| 6,276,737 B1 | 8/2001 | Cansfield et al. | |
| 6,386,409 B1 | 5/2002 | Cheney | |
| 6,572,169 B2 * | 6/2003 | Panhelleux et al. | 296/24.34 |
| 6,575,528 B2 | 6/2003 | Tiesler et al. | |
| 6,619,716 B1 | 9/2003 | Sturt | |
| 6,669,260 B2 | 12/2003 | Clark et al. | |
| 6,786,518 B2 | 9/2004 | Vitry | |
| 6,824,185 B2 | 11/2004 | Tiesler et al. | |
| 7,137,659 B2 * | 11/2006 | Tiesler et al. | 296/37.8 |
| 7,258,381 B2 * | 8/2007 | Sturt et al. | 296/24.34 |
| 2003/0025339 A1 | 2/2003 | Vitry et al. | |
| 2004/0020935 A1 | 2/2004 | Inari | |

FOREIGN PATENT DOCUMENTS

GB      2419919 A     10/2006

\* cited by examiner

*Primary Examiner*—Dennis H Pedder
(74) *Attorney, Agent, or Firm*—Brooks Kushman P.C.

(57) ABSTRACT

As aspect of the invention provides an article holding assembly that is attachable to a mounting member. An aspect of the invention provides a console assembly that is attachable to a mounting member in a vehicle.

12 Claims, 5 Drawing Sheets

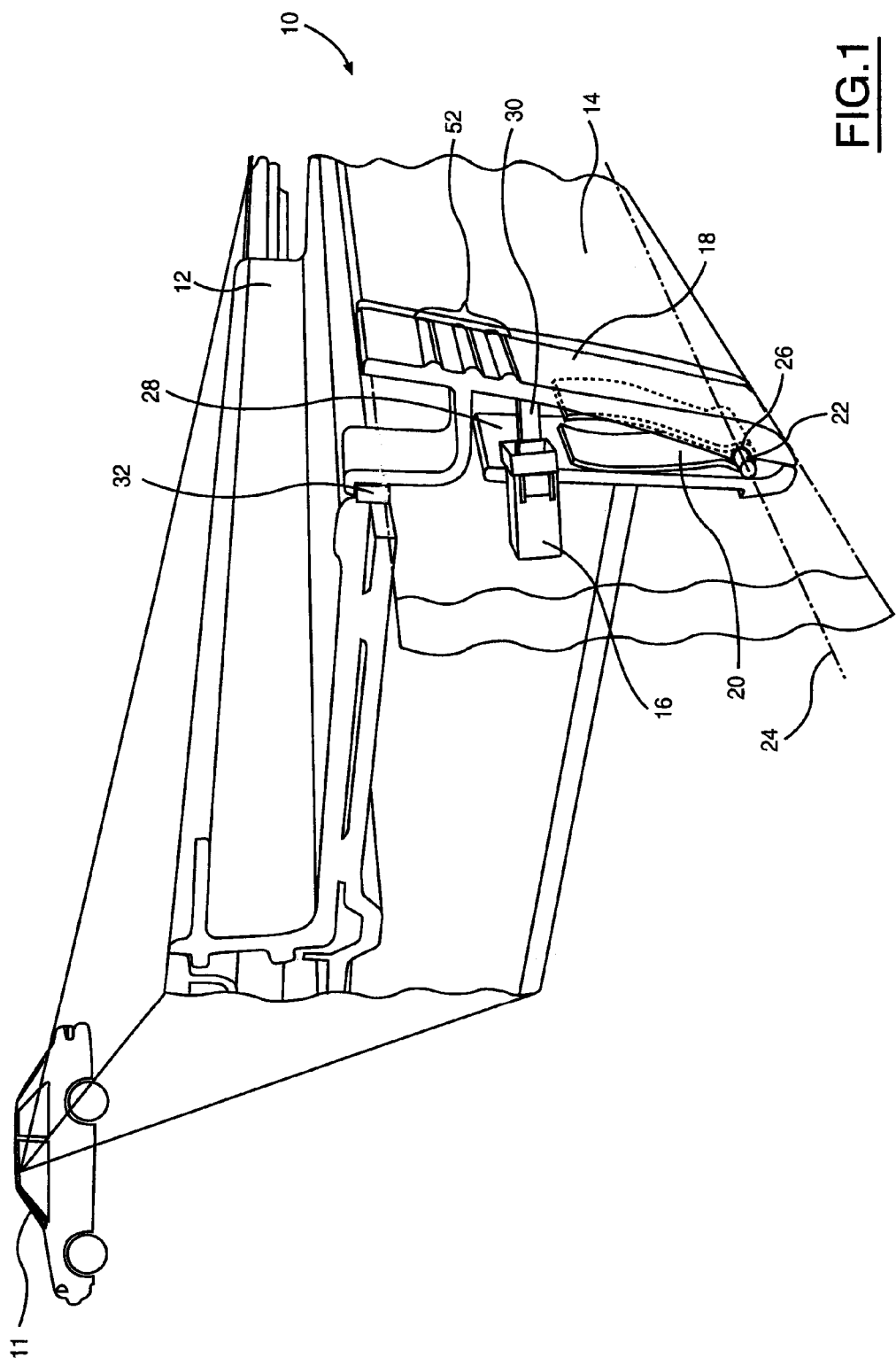

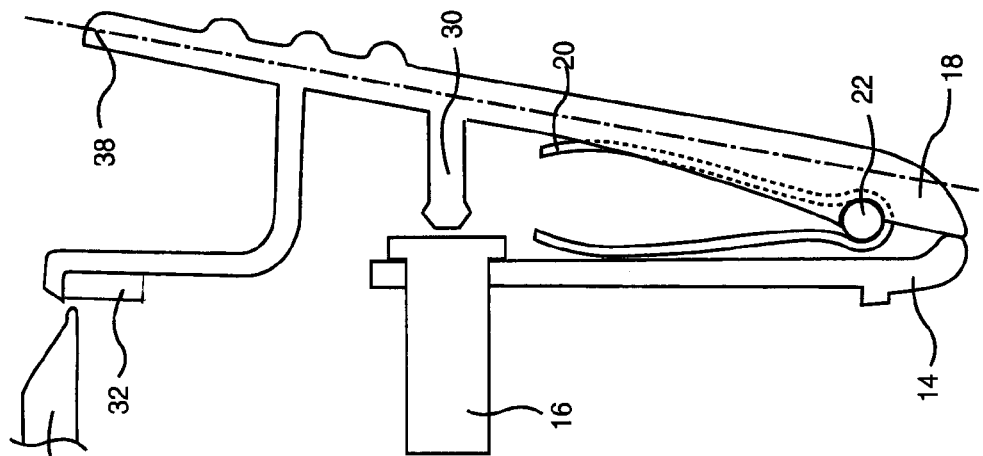
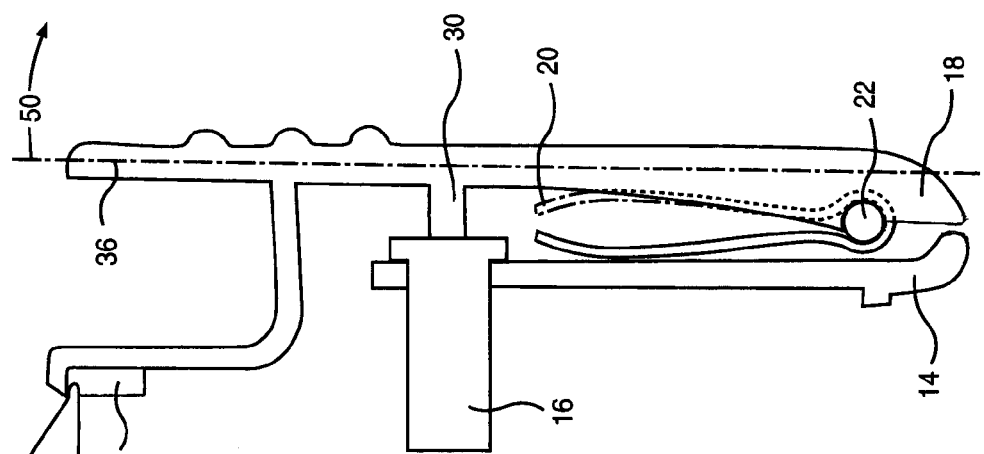
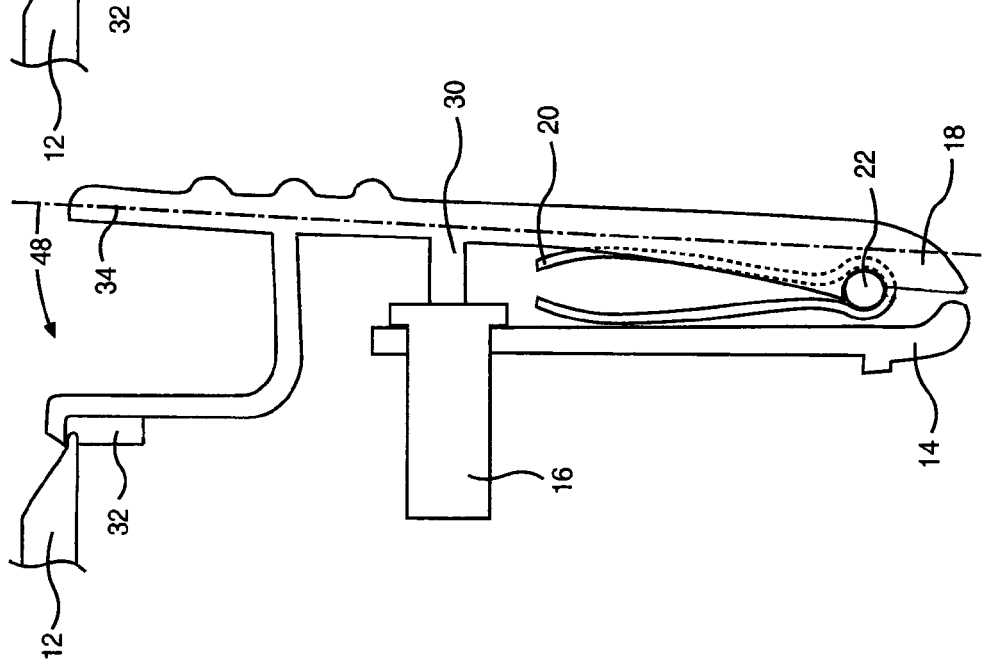

SYSTEM FOR ATTACHING AN ARTICLE HOLDING ASSEMBLY TO A MOUNTING MEMBER IN A VEHICLE

BACKGROUND OF THE INVENTION

1. Field of the Invention

The invention generally relates to a system for attaching an article holding assembly to a mounting member in a vehicle.

2. Background Art

Article holding assemblies, such as console assemblies, may include fastening mechanisms that are configured for attachment to one or more mounting members. U.S. Pat. No. 6,669,260, for example, discloses holders for attaching a console module to a pair of rails.

SUMMARY OF THE INVENTION

According to one aspect of the invention, an article holding assembly that is attachable to a mounting member is provided. The assembly includes a housing and a latching member that includes a locking member. The assembly also includes a handle pivotably attached to the housing such that the handle is moveable with respect to the housing between first, second, and third positions. The handle includes a striking member and a retaining member. The retaining member is engageable with the mounting member when the handle is in the first position. The striking member is engaged with the latching member and locked by the locking member when the handle is in the first position. The striking member is engaged with the latching member and unlocked from the locking member when the handle is in the second position. The retaining member is disengageable from the mounting member when the handle is moved toward the third position. The handle travels in a first direction from the first position toward the second position. The handle travels in a second direction generally opposite the first direction from the second position toward the third position.

According to another aspect of the invention, an article holding assembly is provided for attachment to a mounting member of a vehicle. The assembly includes a housing and a first latching member that includes a locking member. The assembly also includes a second latching member that is moveable with respect to the housing between first and second positions. The second latching member is engageable with the mounting member when the second latching member is in the first position. The second latching member is disengageable from the mounting member when the second latching member is moved toward the second position. The assembly further includes a handle pivotably attached to the housing. The handle includes a striking member and a slotted member. The slotted member is engaged with the second latching member and configured to assist in moving the second latching member between the first and second positions. The handle is moveable between a locked position, in which the second latching member is in the second position and the striking member is engaged with the first latching member and locked by the locking member, and an unlocked position, in which the second latching member is in the first position and the striking member is disengaged from the first latching member. A distance between an end of the handle and a portion of the second latching member that is engageable with the mounting member, when the second latching member is in the second position, is less than the distance between the end of the handle and the portion of the second latching member when the second latching member is in the first position.

According to another aspect of the invention, a console assembly that is attachable to a mounting member in a vehicle is provided. The console assembly includes a console body and a latching member. The console assembly also includes a handle attached to the console body. The handle is moveable with respect to the console body. The handle includes a striking member and a retaining member. The retaining member is engageable with the mounting member. The console assembly further includes a spring associated with the handle and configured to assist in moving the handle. The striking member is engaged with the latching member when the handle is positioned such that mechanical energy stored by the spring is generally at a maximum.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 shows a perspective view of an embodiment of the invention.

FIG. 2A shows a cross section of the embodiment of FIG. 1.

FIG. 2B shows a cross section of the embodiment of FIG. 1.

FIG. 2C shows a cross section of the embodiment of FIG. 1.

DETAILED DESCRIPTION

Figure 3A:
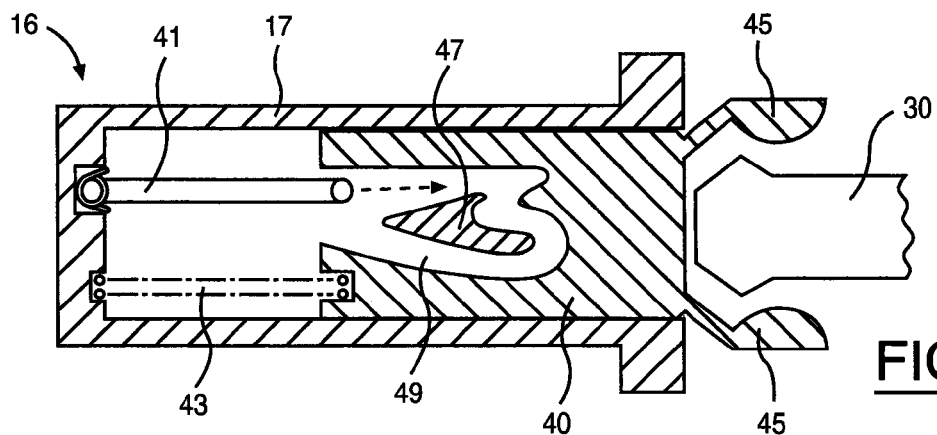
FIG. 3A shows a cross section of a portion of FIG. 2C.

FIG. 1 shows an article holding assembly, such as a console bin assembly 10, for a vehicle 11 that is attachable to a mounting member, such as a mounting track 12, which is mounted in the vehicle 11. The console bin assembly 10 includes a housing, such as bin 14, a latching member, such as latch 16, a handle 18, and a spring 20 associated with the handle 18.

The handle 18 is pivotably attached to a pivot member, such as pin 22, having an axis 24 at pivot 26. The pin 22 spans a recessed area 28 of the bin 14 configured to accommodate the handle 18. The pin 22 is molded as part of the bin 14. The pin 22, however, may be separately manufactured and attached to the bin 14. The handle 18 is snapped onto the pin 22 and rotates about the axis 24 with respect to the bin 14. The handle 18 may, however, be attached to the pin 22 in any desired manner.

The handle 18 includes a striking member 30, or striker, and a retaining member, such as brake pad 32. The striker 30 is configured to engage the latch 16 when the handle is in certain positions as will be explained below in detail. The striker 30 and the latch 16 are oriented vertically. The striker 30 and the latch 16, however, may be oriented horizontally or may be oriented in any desired fashion. The brake pad 32 is configured to engage the mounting track 12 when the handle is in certain positions as will be explained below in detail.

FIGS. 2A, 2B, and 2C show a cross section of the console bin assembly 10 when the handle 18 is in several positions. The handle 18 is moveable with respect to the bin 14 between a first position 34, a second position 36, and a third position 38.

FIG. 2A shows the handle 18 in the first position 34. Referring to FIGS. 1 and 2A, the brake pad 32 is engaged with the mounting track 12 to thereby attach the bin 14 to the mounting track 12. The brake pad 32 is made of a non-skid material, such as a polyurethane, which resists movement of the console bin assembly 10 with respect to the mounting track 12 in a direction parallel to the axis 24. The brake pad 32 may be attached to the handle 18 in any desired fashion. For example, the brake pad may be co-molded with the handle 18. When the handle 18 is in the first position 34, the striker 30 is engaged by the latch 16 and locked by a locking member 40, or lock, within the latch 16 as will be explained in greater detail with reference to FIGS. 3A, 3B, 3C, and 3D.

Operation of the lock 40 and striker 30 as the handle 18 moves from the first position 34 to the second position 36 and from the second position 36 to the third position 38 will be explained below in detail with reference to FIGS. 3A, 3B, 3C, and 3D.

FIG. 2B shows the handle 18 in the second position 36. When the handle 18 is in the second position 36, the striker 30 is engaged with the latch 16 and unlocked from the lock 40 as will be explained in greater detail with reference to FIGS. 3A, 3B, 3C, and 3D.

FIG. 2C shows the handle 18 in the third position 38. When the handle 18 is in the third position 38, the brake pad 32 is disengaged from the mounting track 12. With the brake pad 32 disengaged from the mounting track 12, the bin 14 can be repositioned along the mounting track 12. When the handle 18 is in the third position 38, the striker 30 is disengaged from the latch 16. The striker 30, however, may be configured to be engaged with the latch 16 but not locked by the lock 40.

The handle 18 travels in a first direction 48, or counter clockwise from the perspective shown in FIG. 2A, from the first position 34 to the second position 36. The handle 18 travels in a second direction 50, or clockwise from the perspective shown in FIG. 2B, generally opposite the first direction 48 from the second position 36 to the third position 38.

Referring to FIGS. 1, 2A, 2B, and 2C, the handle 18 also includes a portion, such as pad 52, configured to receive a force applied by a user to move the handle 18 from the first position 34 toward the second position 36. The pad 52 is located near an end of the handle 18 opposite the pivot 26. To unlock the striker 30 from the latch 16 when the handle is in the first position 34, the user pushes on the pad 52 of the handle 18 until the handle 18 reaches the second position 36. To lock the striker 30 when the handle 18 is in the third position 38, the user pushes on the pad 52 of the handle 18 until the handle 18 reaches the first position 34.

The spring 20 associated with the handle 18 is configured to assist in moving the handle 18 from the second position 36 to the third position 38. The spring 20 is attached to the pin 22. As the handle 18 travels from the first position 34 toward the second position 36, the spring 20 is compressed and thus the mechanical energy stored by the spring 20 increases. The striker 30 is engaged with the latch 16 and unlocked from the lock 40 when the mechanical energy stored by the spring 20 is generally at a maximum. This stored mechanical energy can then assist in moving the handle 18 from the second position 36 toward the third position 38 as the spring 20 relaxes. As such, the mechanical energy stored by the spring 20 is greater when the handle 18 is in the first position 34 than when the handle is in the third position 38.

FIG. 3A shows a cross section of the latch 16 when the handle 18 is in the third position 38 (FIG. 2C). The latch 16 includes a latch housing 17, the lock 40, a lock striker 41, a latch spring 43, and a jaw portion 45.

The lock 40 is moveable with respect to the latch housing 17 and lock striker 41. The lock 40 includes an engaging element, such as heart feature 47, and a recessed area 49. As the handle 18 is moved from the third position 38 (FIG. 2C) to the first position 34 (FIG. 2A), the striker 30 engages the jaw portion 45 which is connected to the lock 40 via a living hinge. The jaw portion closes around the striker 30 as the striker is pushed into the latch 16. The lock 40 moves toward the lock striker 41, causing the lock striker 41 to travel along the path within the recessed area 49 indicated by arrows, as the striker 30 is pushed into the latch 16. The lock 40 compresses the latch spring 43 as the lock 40 moves toward the lock striker 41.

Figure 3B:
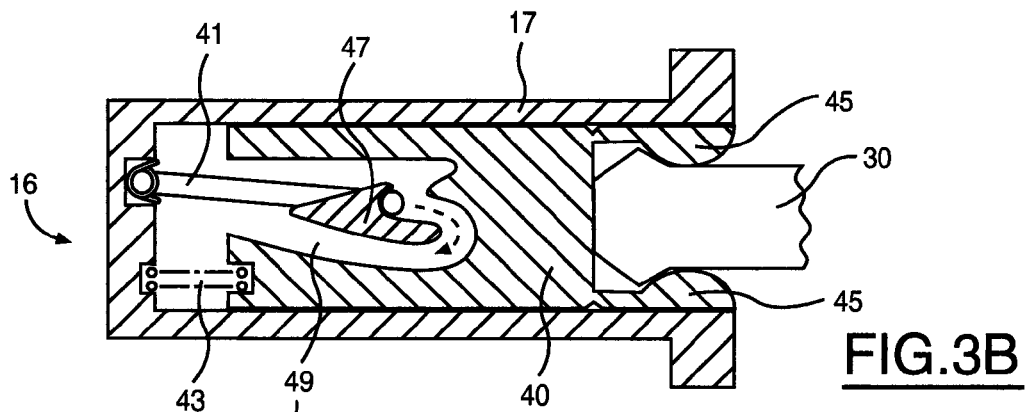
FIG. 3B shows a cross section of a portion of FIG. 2A.

FIG. 3B shows a cross section of the latch 16 when the handle 18 is in the first position 34 (FIG. 2A). The lock striker 41 is locked in place by the heart feature 47 and the latch spring 43.

As the handle 18 is pushed from the first position 34 (FIG. 2A) toward the second position 36 (2B), the lock striker 41 travels along the path within the recessed area 49 indicated by arrows.

Figure 3C:
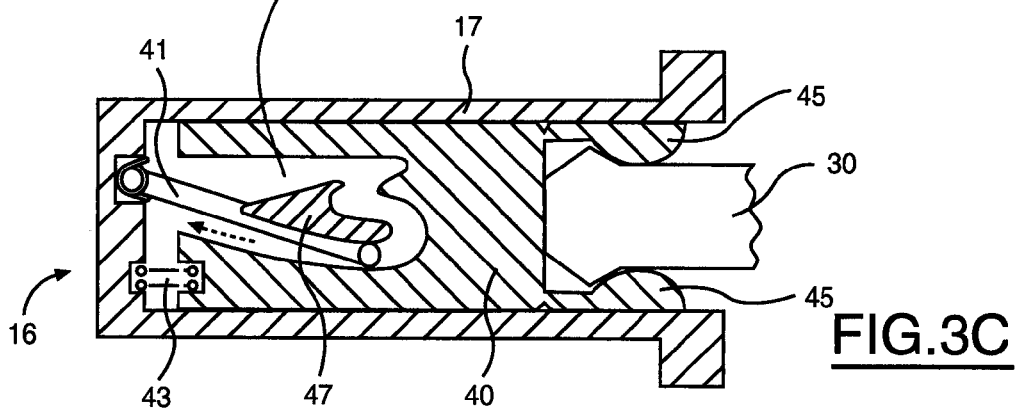
FIG. 3C shows a cross section of a portion of FIG. 2B.

FIG. 3C shows a cross section of the latch 16 when the handle is in the second position 36 (FIG. 2B). The latch spring 43 will cause the lock 40 to move relative to the lock striker 41 such that the lock striker 41 will travel along the path within the recessed area 49 indicated by arrows. As the lock 40 is pushed away from the lock striker 41 by the latch spring 43, the jaw portion 45 opens with respect to the striker 30 allowing the striker 30 to be disengaged from the latch 16.

Figure 3D:
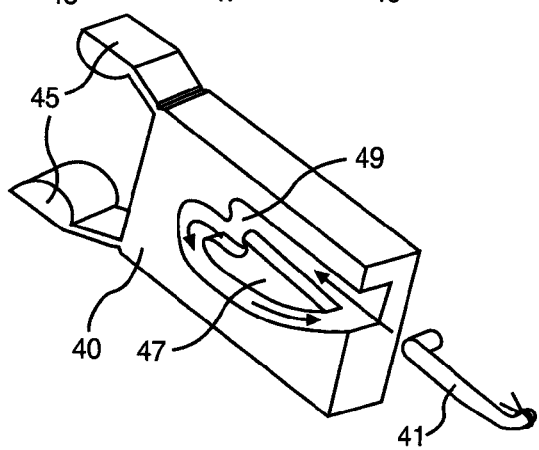
FIG. 3D shows a perspective view of a portion of FIG. 2A, FIG. 2B, and FIG. 2C.

FIG. 3D shows a perspective view of the lock 40, the lock striker 41, the jaw portion 45, the heart feature 47, and the recessed area 49.

Figure 4:
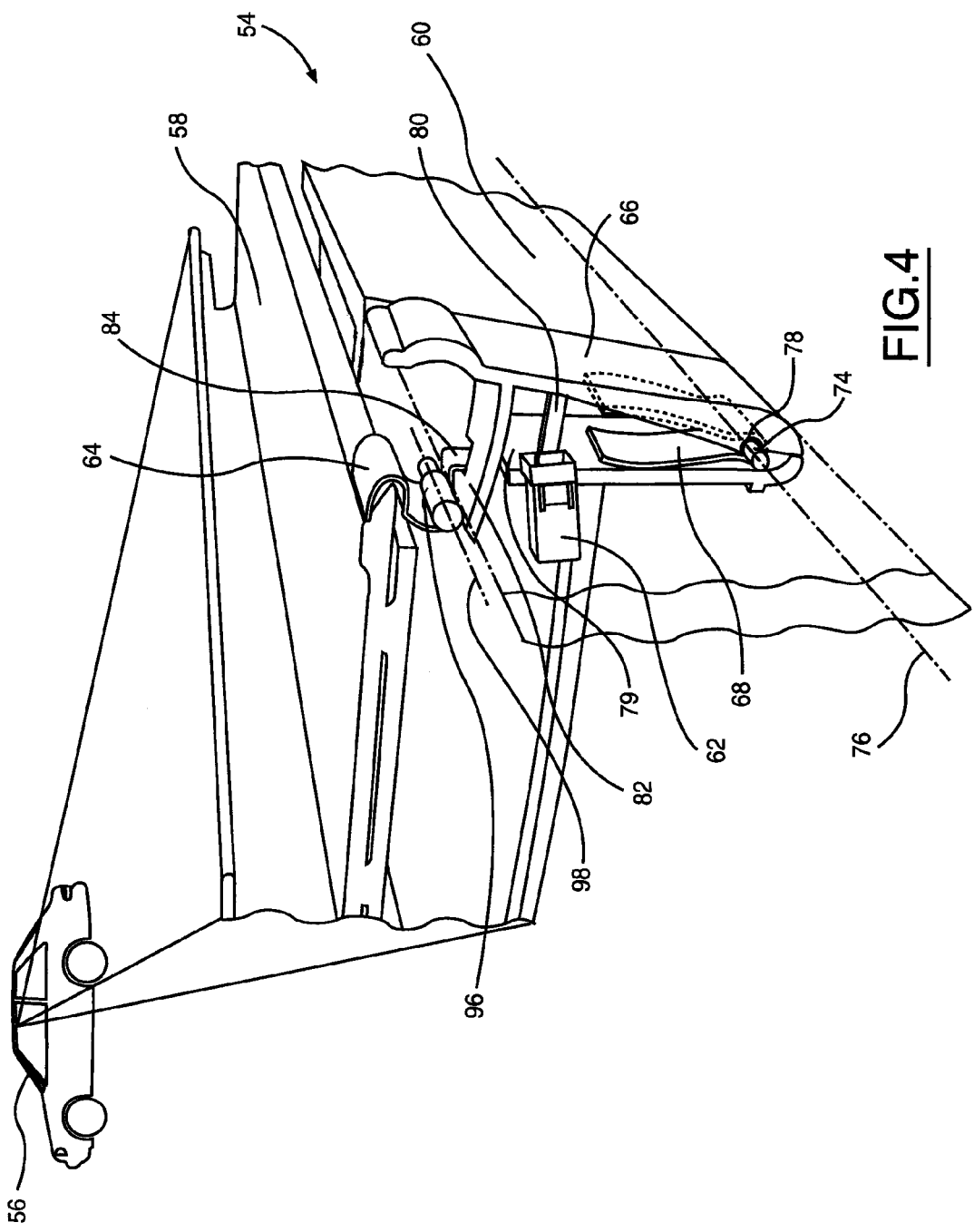
FIG. 4 shows a perspective view of an embodiment of the invention.

FIG. 4 shows a second embodiment of an article holding assembly, such as console assembly 54, according to the invention. The console assembly 54 may be used with a vehicle 56, and is attachable to a mounting member 58 mounted in the vehicle 56. The console assembly 54 includes a housing 60, such as a console body, a first latching member 62, a second latching member 64, a handle 66, and a spring 68 associated with the handle 66.

Figure 5A:
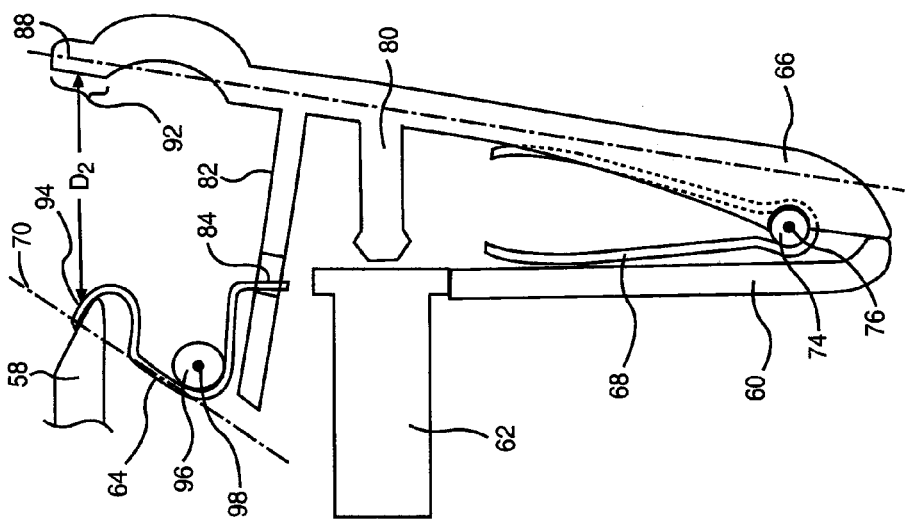
FIG. 5A shows a cross section of the embodiment of FIG. 4.
Figure 5B:
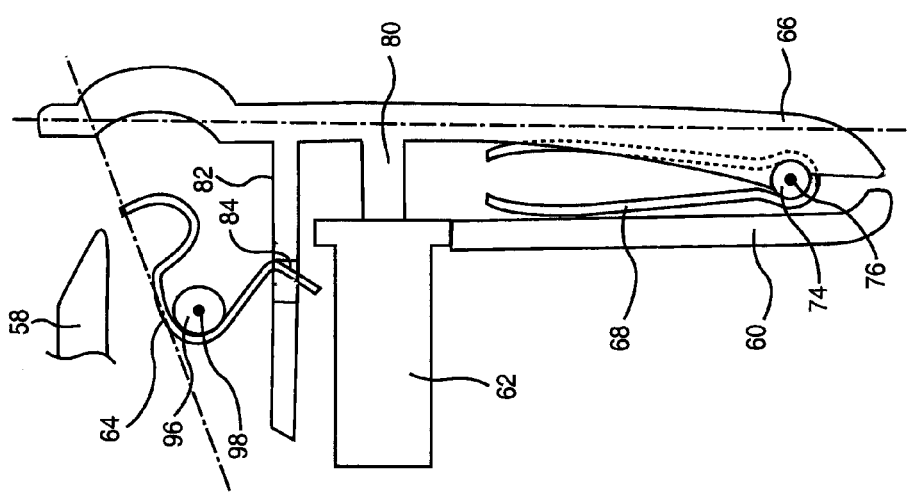
FIG. 5B shows a cross section of the embodiment of FIG. 4.
Figure 5C:
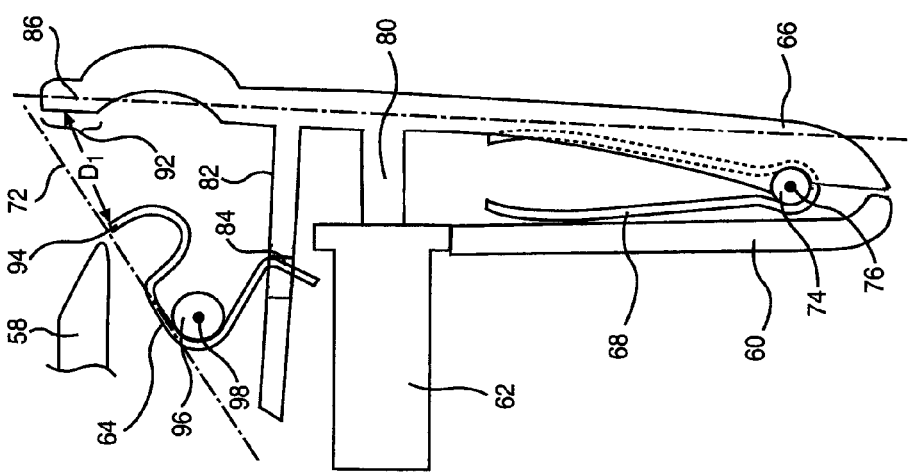
FIG. 5C shows a cross section of the embodiment of FIG. 4.

FIGS. 5A, 5B, and 5C show a cross section of the console assembly 54 when the handle 66 is in several positions. The second latching member 64 is moveable with respect to the housing 60 between a first position 70 (FIG. 5C) and a second position 72 (FIG. 5A). When the second latching member 64 is in the first position 70, the second latching member 64 is engaged with the mounting member 58 thereby attaching the housing 60 to the mounting member 58. When the second latching member 64 is in the second position 72, the second latching member 64 is disengaged from the mounting member 58. Movement of the second latching member 64 from the first position 70 to the second position 72 and visa versa with respect to the handle 66 will be explained below in detail.

Referring to FIGS. 4, 5A, 5B, and 5C, the handle 66 is pivotably attached to a pivot member 74 having an axis 76 at pivot 78. The pivot member 74 spans a recessed area 79 of the housing 60 configured to accommodate the handle 66. The pivot 78 of the handle 66 is snapped onto the pivot member 74 and rotates about the axis 76 with respect to the housing 60.

The handle 66 includes a striking member 80 and a slotted member 82. The striking member 80 is configured to engage the first latching member 62 when the handle is in certain positions as will be explained below in detail. The slotted member 82 is engaged with a projection, such as pronged portion 84, of the second latching member 64. The slotted member 82 is configured to assist in moving the second latching member 64 between the first position 70 and the second position 72 as will be explained below in detail.

The handle 66 is moveable between a locked position 86 (FIG. 5A) and an unlocked position 88 (FIG. 5C). When the handle 66 is in the locked position 86, the striking member 80 is engaged with the first latching member 62 and locked by a locking member 90 within the first latching member 62. When the handle 66 is in the unlocked position 88, the striking member 80 is disengaged from the first latching member 62.

Operation of the locking member 90 and the striking member 80 as the handle 66 moves between the locked position 86 and the unlocked position 88 is explained above with reference to FIGS. 3A, 3B, 3C, and 3D. For the purpose of this explanation, locking member 90 corresponds to lock 40, striking member 80 corresponds to striker 30, and handle 66 corresponds to handle 18.

When the handle 66 is in the locked position 86, the second latching member 64 is in the second position 72. A user can reposition the console assembly 54 along the mounting member 58 when the handle is in the locked position 86 because the second latching member 64 is disengaged from the mounting member 58. When the handle 66 is in the unlocked position 88, the second latching member 64 is in the first position 70. A user cannot reposition the console assembly 54 along the mounting member 58 when the handle is in the unlocked position 88 because the second latching member 64 is engaged with the mounting member 58.

A distance D1 between an end of the handle 92 and a portion 94 of the second latching member 64 that is engageable with the mounting member 58, when the second latching member 64 is in the second position 72 (FIG. 5A), is less than a distance D2 between the end of the handle 92 and the portion of the second latching member 94 when the second latching member 64 is in the first position 70 (FIG. 5C).

The second latching member 64 is generally pivotable about a pin 96 having an axis 98. The axis 98 is spaced away from the axis 76. The axis 98 and axis 76 are generally parallel.

When the user pushes the handle from the unlocked position 88 toward the locked position 86, the slotted member 82 pushes the pronged portion 84 of the second latching member 64 in a clockwise direction, from the perspective shown in FIGS. 5A, 5B, and 5C. This causes the portion 94 of the second latching member that is engageable with the mounting member 58 to also pivot in a clockwise direction, again from the perspective shown in FIGS. 5A, 5B, an 5C, about the axis 98. The pivoting of the second latching member 64 in a clockwise direction, again from the perspective shown in FIGS. 5A, 5B, an 5C, disengages the second latching member 64 from the mounting member 58. Likewise, once the user has unlocked the handle 66 from the lock 90 (FIG. 5B and FIG. 3C) and moves the handle 66 toward the unlocked position 88, the slotted member 82 pushes the pronged portion 84 of the second latching member 64 in a counterclockwise direction, from the perspective shown in FIGS. 5A, 5B, an 5C. This causes the portion 94 of the second latching member 64 that is engageable with the mounting member 58 to also pivot in a counterclockwise direction, again from the perspective shown in FIGS. 5A, 5B, an 5C, about the axis 98. The pivoting of the second latching member 64 in a counterclockwise direction, again from the perspective shown in FIGS. 5A, 5B, an 5C, engages the second latching member 64 with the mounting member 58.

The spring 68 associated with the handle 66 is configured to assist in moving the handle 66 from the locked position 86 to the unlocked position 88. The spring 68 is attached to the pivot member 74. As the handle 66 travels from the unlocked position 88 toward the locked position 86, the spring 68 is compressed and thus the mechanical energy stored by the spring 68 increases. This stored mechanical energy can then assist in moving the handle 66 from the locked position 86 to the unlocked position 88 as the spring 68 relaxes. As such, the mechanical energy stored by the spring 68 is greater when the handle 66 is in the locked position 86 than when the handle is in the unlocked position 88.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An article holding assembly that is attachable to a mounting member comprising:
    a housing;
    a latching member including a locking member; and
    a handle pivotably attached to the housing such that the handle is moveable with respect to the housing between first, second, and third positions, the handle including a striking member and a retaining member, the retaining member being engageable with the mounting member when the handle is in the first position to thereby attach the housing to the mounting member, the striking member being engaged with the latching member and locked by the locking member when the handle is in the first position, the striking member being engaged with the latching member and unlocked from the locking member when the handle is in the second position, the retaining member being disengageable from the mounting member when the handle is moved toward the third position, wherein the handle travels in a first direction from the first position toward the second position, and the handle travels in a second direction generally opposite the first direction from the second position toward the third position.

2. The assembly of claim 1 wherein the striking member is disengaged from the latching member when the handle is in the third position.

3. The assembly of claim 1 wherein the housing has a pivot member, and the handle is snapped onto the pivot member.

4. The assembly of claim 1 further comprising a spring associated with the handle and configured to assist in moving the handle from the second position toward the third position.

5. The assembly of claim 4 wherein mechanical energy stored by the spring is greater when the handle is in the second position than when the handle is in the first position.

6. The assembly of claim 4 wherein mechanical energy stored by the spring is greater when the handle is in the first position than when the handle is in the third position.

7. The assembly of claim 1 wherein the handle pivots about an axis, and wherein the retaining member includes a portion that, when in contact with the mounting member, is configured to resist movement of the assembly with respect to the mounting member in a direction parallel to the axis.

8. The assembly of claim 1 wherein the handle includes a portion configured to receive a force applied by a user to move the handle from the first position toward the second position.

9. The assembly of claim 8 wherein the portion is located near an end of the handle opposite an end of the handle about which the handle pivots.

10. A console assembly that is attachable to a mounting member in a vehicle comprising:
- a console body;
- a latching member;
- a handle attached to the console body that is moveable with respect to the console body, the handle including a striking member and a retaining member, the retaining member being engageable with the mounting member to thereby attach the console body to the mounting member; and
- a spring associated with the handle and configured to assist in moving the handle, wherein the striking member is engaged with the latching member when the handle is positioned such that mechanical energy stored by the spring is generally at a maximum wherein the latching member includes a locking member and wherein the striking member is unlocked from the locking member when the handle is positioned such that the mechanical energy stored by the spring is generally at the maximum.

11. The assembly of claim 10 wherein the handle includes a portion configured to receive a force applied by a user to move the handle and wherein the portion is located near an end of the handle.

12. A console assembly that is attachable to a mounting member in a vehicle comprising:
- a console body having a pivot member;
- a latching member;
- a handle pivotably attached to the console body that is moveable with respect to the console body, the handle being snapped onto the pivot member and including a striking member and a retaining member, the retaining member being engageable with the mounting member to thereby attach the console body to the mounting member; and
- a spring associated with the handle and configured to assist in moving the handle, wherein the striking member is engaged with the latching member when the handle is positioned such that mechanical energy stored by the spring is generally at a maximum.

\* \* \* \* \*